United States Patent [19]
Shimamura et al.

[11] Patent Number: 4,930,607
[45] Date of Patent: Jun. 5, 1990

[54] VEHICULAR BRAKE HOLDING SYSTEM

[75] Inventors: Morihiko Shimamura; Shinobu Kamono; Junichi Okuyama; Kunio Okano; Naoki Komine, all of Saitama, Japan

[73] Assignee: Jidosha Kiki Co., Ltd., Tokyo, Japan

[21] Appl. No.: 222,657

[22] Filed: Jul. 21, 1988

[30] Foreign Application Priority Data

Jul. 29, 1987 [JP] Japan .................. 62-116411[U]
Oct. 22, 1987 [JP] Japan .................. 62-267547

[51] Int. Cl.$^5$ .................. B60K 41/20; B60K 41/28
[52] U.S. Cl. .................. 192/1.33; 192/0.049; 192/1.23
[58] Field of Search .................. 192/0.049, 0.094, 1.23, 192/1.33, 1.35; 91/422, 437

[56] References Cited

U.S. PATENT DOCUMENTS

| | | | |
|---|---|---|---|
| 2,669,329 | 2/1954 | Price | 192/1.33 |
| 2,978,080 | 4/1961 | Beatty | 192/1.33 |
| 4,759,255 | 7/1988 | Shimamura | 91/6 |

FOREIGN PATENT DOCUMENTS

| | | | |
|---|---|---|---|
| 657042 | 2/1963 | Canada | 192/1.23 |
| 59-96036 | 6/1984 | Japan | |
| 60-13854 | 1/1985 | Japan | |

Primary Examiner—Leslie A. Braun
Assistant Examiner—David A. Testardi
Attorney, Agent, or Firm—Sughrue, Mion, Zinn, Macpeak & Seas

[57] ABSTRACT

A brake booster for holding the braking action even if the brake pedal is released. The booster has a low pressure chamber and a variable pressure chamber with a diaphragm therebetween for moving the output shaft to the brake cylinder. A valve mechanism mechanically controlled by the brake pedal switches a communication passage between the low and variable pressure chambers and an atmospheric pressure passage from the variable pressure chamber to the exterior. A first solenoid valve can close the communication passage between the low and variable pressure chambers irrespective of the brake pedal position so as to hold the braking. A second solenoid valve can control a passage between the variable pressure chamber and the low pressure source so that the braking release can be gently effected.

13 Claims, 5 Drawing Sheets

VEHICULAR BRAKE HOLDING SYSTEM

BACKGROUND OF THE INVENTION

The present invention relates to a vehicle brake system, particularly to a vehicle brake system employing a brake booster. The present invention also relates to a vehicle brake holding system capable of automatically maintaining the stoppage of a vehicle when it is stopped on a slope or the like and the driver of the vehicle intends to keep it stopped.

A conventional vehicle brake system, which can keep braking a vehicle through the use of a brake booster even if the depressive force applied to a brake pedal is removed has been disclosed in published Japanese Utility Model Application (OPI) No. 13854/85 (the term "OPI" as used herein means an "unexamined published application"). The vehicle brake system includes a power piston slidably supported in a shell. A valve mechanism is provided in a valve casing at the central portion of the power piston. A constant pressure chamber is defined in a forward position with regard to the direction of braking action of the power piston. A variable pressure chamber is defined in a rearward position with regard to that direction. A communication passage connects the constant pressure chamber and the variable pressure chamber to each other through the valve mechanism. A pressure passage connects the variable pressure chamber and a high pressure fluid source to each other through the valve mechanism. An input shaft puts the valve plunger of the valve mechanism into action to switch fluid passages to disconnect the constant pressure chamber and the variable pressure chamber from each other and feeds a high pressure fluid into the variable pressure chamber to move the power piston forward. A first solenoid valve opens or closes the communication passage between the valve mechanism and the constant pressure chamber. During the action of the brake booster, the communication passage is closed by the first solenoid valve so that the constant pressure chamber and the variable pressure chamber are disconnected from each other even if the communication passage is opened by the valve mechanism because the depressive force is removed from the input shaft. The depression of an accelerator pedal, the non-depression of a clutch pedal and so forth are detected for the conventional vehicle brake system to cease the continuance of the braking of the stopped vehicle.

In another conventional vehicle brake device disclosed in published Japanese patent application (OPI) No. 96036/84, the holding of the braking of a vehicle is gradually released, because a strong shock would be caused by the quick start of the vehicle if the holding of the braking were quickly released. This vehicle brake system does not employ a brake booster but functions so that a brake pedal is maintained in a depressed position by a solenoid. When the brake pedal is released from the depressed position, the supply of the braking force holding signal to the solenoid is not immediately halted but intermittently halted to gradually cease holding the braking of the stopped vehicle.

If the first solenoid valve of the first described conventional vehicle brake system is intermittently opened and closed and then completely opened, then similarly to the intermittent halting of the supply of the braking force holding signal to the solenoid in the second described conventional brake system, the vehicle can be smoothly started when the holding of the braking of the stopped vehicle is released. In that case, however, it is likely that the life of the first solenoid valve is shortened and chattering is caused by the intermittent opening and closing of the first solenoid valve. These are two significant problems.

When a vehicle is to be temporarily stopped with a standard brake system, a brake pedal is depressed to brake the vehicle through the use of a hydraulic brake. In the vehicular brake system, a brake booster is provided between the brake pedal and a hydraulic cylinder which functions to put the hydraulic brake into action. In the brake booster, atmospheric pressure and a negative pressure, which is produced in the intake manifold of an engine or produced by a vacuum pump, are introduced into a shell divided into two chambers. The difference between the atmospheric and the negative pressures is used to boost the depressive force on the brake pedal to put the hydraulic cylinder into action to provide power braking. However, it is an inconvenience for the driver of the vehicle to keep the vehicle stopped on a slope or the like by continuing to depress the brake pedal with the standard brake system. This is a further problem.

In order to solve the latter problem, the present application proposed an improved brake booster as disclosed in the U.S. patent application Ser. No. 53,994. In the improved brake booster, one passage connects a front and a rear pressure chamber which are defined in a shell by a diaphragmed piston in a front and a rear position with regard to the direction of action of the piston. Another passage connects to each other the rear pressure chamber and an external pressure fluid source. Then, a valve mechanism is regulated by an input shaft mechanically coupled to a brake pedal so that the two passages are switched. The improved brake booster also includes an output shaft which moves with the piston, which is displaced depending on the pressure difference between the front and the rear pressure chambers. The improved brake booster is characterized in that a solenoid valve for opening or closing the passage for connecting the front and the rear pressure chambers to each other is provided in the front pressure chamber and is attached to the piston.

When the improved brake booster is used in a vehicle brake system, operating conditions are detected by the sensors of a controller. When certain operating conditions are detected, the solenoid of the solenoid valve is energized to close the valve. At that time, the controller acts so that another solenoid valve provided in a passage connecting the rear pressure chamber to the atmosphere is opened for a prescribed time to introduce the atmospheric pressure into the rear pressure chamber to brake a vehicle by a braking force corresponding to the atmospheric pressure. The braking occurs even if the brake pedal is not depressed. When the held braking of the vehicle is ceased, the solenoid of the first solenoid valve is de-energized by the controller so as to open the passage connecting the front and the rear pressure chambers through the valve mechanism. The vehicle stoppage brake device has a problem that it is not provided with a fail-safe means against abnormalities such as the disconnection of wires for a vehicle speed signal and a clutch signal which carry some of the prescribed operating conditions necessary for the device.

SUMMARY OF THE INVENTION

The present invention was made in order to solve the above-mentioned problems.

Accordingly, in a first aspect of the present invention a vehicle brake system includes a variable pressure chamber which is connected to a low pressure fluid source through a low pressure passage. A second solenoid valve smaller in the cross-sectional area for fluid passage than a first solenoid valve is provided in the low pressure passage so that the second solenoid valve is opened prior to the first solenoid valve when the braking of a stopped vehicle is ceased. Because of the smaller cross-sectional area, the braking of the stopped vehicle is prevented from being quickly terminated. The first solenoid valve of larger cross-sectional area is opened after the second solenoid valve is opened. As a result, the braking of the stopped vehicle is prevented from lasting beyond the time required. The vehicle can thus be smoothly started without producing a strong shock. Since the first and the second solenoid valves are not intermittently opened and closed, it is unlikely that the lives of the valves are shortened nor is a shock caused by such intermittent opening and closing.

In a second aspect of the present invention, a vehicle brake holding device is reliably put into action in accordance with specified operating conditions necessary to a vehicle. The brake holding device comprises a brake booster, a first solenoid valve, a second solenoid valve, and a controller, and can keep the vehicle stopped. In the brake booster, a valve mechanism is regulated by an input shaft movably coupled to a brake pedal so as to switch a passage for connecting a front and a rear pressure chamber and another passage for connecting the rear pressure chamber to an atmospheric pressure. The front and rear pressure chambers are defined in a shell by a diaphragmed piston in a front and a rear position with regard to the direction of action of the piston. The brake booster also includes an output shaft movably coupled to the piston, which is displaced depending on the pressure difference between the front and the rear pressure chambers. The passage connecting the front and the rear pressure chambers through the valve mechanism of the brake booster is opened or closed by the first solenoid valve. The passage for connecting the rear pressure chamber and a vacuum source is opened or closed by the second solenoid valve. When during the braking of the vehicle a prescribed time period has occurred in which an acceleration signal is absent and the vehicle is stopped, the controller acts to close the first solenoid valve to maintain the braking of the vehicle. When a clutch is engaged during the holding of the braking of the vehicle, the controller acts to open the second solenoid valve. When the engagement of the clutch has thereafter lasted for a prescribed time during the holding of the braking of the vehicle, the controller acts to close the second solenoid valve and open the first solenoid valve to cease the continuance of the braking of the vehicle. Otherwise, when the acceleration signal is present and the vehicle is started during the holiday of the braking of the vehicle, the controller acts to open the first solenoid valve to cease the holding of the braking of the vehicle. Since the controller acts depending on the specified operating conditions necessary to the vehicle, the vehicle brake holding is specific and practical. Even if a vehicle speed signal is absent due to the defect of a vehicle speed sensor, the braking of the vehicle can be held through other signals. Even if the clutch signal is absent due to the defect of a clutch signal line, the holding of the braking of the vehicle can be ceased through other signals. Fail-safe means are thus provided for the vehicle speed sensor and the clutch signal line, respectively.

DETAILED DESCRIPTION OF EXEMPLARY EMBODIMENTS

Two embodiments of the present invention will be hereafter described in detail with reference to the attached drawings.

Figure 1:
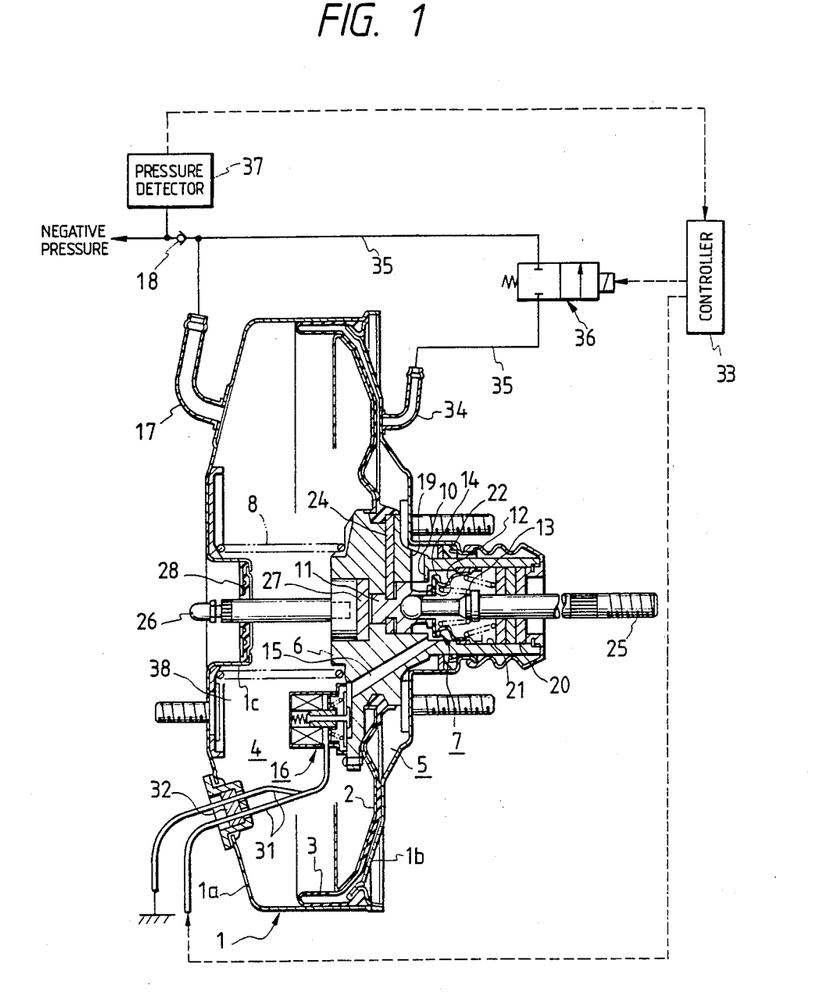
FIG. 1 shows a sectional view of the vehicle brake system which is an embodiment of the present invention.

FIG. 1 shows a vehicle brake system which is one of the embodiments and includes a brake booster whose shell 1 consists of a front shell 1a and a rear shell 1b. A power piston 2 is slidably supported in the shell 1. A diaphragm 3 is attached to the rear of the power piston 2. The interior of the shell 1 is divided by the power piston 2 and the diaphragm 3 into a constant pressure chamber 4 in a front position and a variable pressure chamber 5 in a rear position. The central part of the power piston 2 is formed as part of a valve casing 6 in which a valve mechanism 7 for switching fluid passages is provided. Normally, the power piston 2, the valve casing 6 and so forth are held by a return spring 8 in non-operative positions (shown in FIG. 1).

The valve mechanism 7 comprises a first valve seat 10 formed on the valve casing 6, a second valve seat 12 formed on a valve plunger 11, and a valve stem 14, which seals against either the valve seat 10 or the other valve seat 12 by the resilient force of a spring 13 acting forward with respect to the power piston 2 (leftward with regard to FIG. 1). An internal opening outside the contact portions of the first valve seat 10 and the valve stem 14 is connected to the constant pressure chamber 4 through a communication passage 15 and a first solenoid valve 16. The constant pressure chamber 4 is connected to the intake manifold (a low pressure source) of an engine (not shown in the drawings) through a negative pressure feed pipe 17 (attached to the shell 1) and a check valve 18. An internal space exposed to the area between the contact portions of the first valve seat 10 and the valve stem 14 and to the area between the second valve seat 12 and the valve stem 14 is connected to the variables pressure chamber 5 through a communication passage 19 provided in the valve casing 6. An internal space between the contact portions of the second valve seat 12 and the valve stem 14 is connected to the atmosphere (a high pressure source) through a pressure passage 21 provided with a filter 20. A seal 22 is slidably fitted on the valve casing 6 so that the variable pressure chamber 5 is hermetically sealed from the exterior of the shell 1.

A key 24 prevents the valve plunger 11 of the valve mechanism 7 from dropping out of the valve casing 6.

The rear end of the valve plunger 11 is coupled to an input shaft 25 mechanically linked to a brake pedal not shown in the drawings. The front end of the valve plunger 11 is opposed to the rear end of an output shaft 26. A reaction disk 27 is interposed between the valve plunger 11 and the output shaft 26.

The front shell 1a has a cylindrical central portion 1c projecting into the interior of the shell 1. A seal 28 within the cylindrical central portion 1c is slidably fitted on the output shaft 26 which extends through the cylindrical central portion 1c so that that front end of the output shaft 26 is mechanically coupled to the piston of a master cylinder not shown in the drawings.

The first solenoid valve 16 is provided in the constant pressure chamber 4 and is attached to the outside of the valve casing 6 under the helical return spring 8. The first solenoid valve 16 opens or closes the communication passage 15 passing through the valve casing 6. Electric wires 31 connected to the first solenoid valve 16 are laid through a seal 32 fitted in the front shell 1a. One of the electric wires 31 is connected to a controller 33 composed of a microcomputer or the like. Since the first solenoid valve 16 is attached to the outside of the valve casing 6 under the return spring 8, the electric wires 31 do not interfere with the return spring.

The variable pressure chamber 5 is connected to the negative pressure source not through the valve mechanism 7 but through a pressure feed pipe 34 (attached to the rear shell 1b), a low pressure passage 35 and the check valve 18. The low pressure passage 35 is fitted with a second solenoid valve 36 smaller in the cross-sectional area of fluid passage than the first solenoid valve 16. The second solenoid valve 36 is also electrically connected to the controller 33.

A pressure detector 37 is provided between the check valve 18 and the negative pressure source. The output signal from the pressure detector 37 is sent to the controller 33.

Normally, the controller 33 acts so that the first solenoid valve 16 is opened and the second solenoid valve 36 is closed. In that case, the brake booster is out of action so that negative pressure introduced into the constant pressure chamber 4 through the negative pressure feed pipe 17 is sent into the communication passage 15 through the first solenoid valve 16 and supplied into the variable pressure chamber 5 through the valve mechanism 7 and the communication passage 19. As a result, no pressure difference exists between the front and rear of the power piston 2, so that the brake booster remains in an nonoperative position (shown in FIG. 1), just as in a conventional brake booster which does not have such solenoid valves.

When the brake pedal is depressed when the brake booster of the vehicle brake system in out of action, a braking force corresponding to the depressive force on the brake pedal is caused just as in the conventional brake booster. When the valve casing 6 is then moved forward because of the action of the brake booster, the first solenoid valve 16 attached to the valve casing 6 is located in an internal space 38 defined in the constant pressure chamber 4 by the cylindrical central portion 1c of the front shell 1a. For that reason, the axial dimension of the brake booster can be made as small as the conventional brake booster although it encloses the first solenoid valve 16.

The controller 33 determines the operating conditions for the vehicle brake system through various sensors not shown in the drawings. There are some prescribed operating conditions, which are some of the above-mentioned conditions and include the condition that an acceleration switch detecting the depression of an accelerator pedal is turned off and the speed of the vehicle is zero as shown at A in FIG. 2. When such operating conditions are determined, the controller 33 energizes the first solenoid valve 16 to close the communication passage 15. As a result, even if the depression of the brake pedal is ceased to thereby connect the constant pressure chamber 4 to the changing pressure chamber 5 through the communication passages 15 and 19 by the valve mechanism 7, the pressure introduced into the variable pressure chamber 5 cannot escape therefrom to the negative pressure source through the constant pressure chamber 4 because the communication passage 15 is closed by the first solenoid valve 16. For that reason, the braking of the stopped vehicle is held.

The brake holding is released following a condition dependent on the type of transmission. If the vehicle is of the manual transmission type, the condition is that the manual transmission of the vehicle is shifted from the neutral position by a gearshift and the depression of a clutch pedal is released during the holding of the braking of the stopped vehicle. If the vehicle is of the automatic transmission type, the condition is that the accelerator pedal is depressed so that the acceleration switch is turned on during the holding of the braking of the stopped vehicle as shown at B in FIG. 2. Then, the controller 33 opens the second solenoid valve 36 before opening the first solenoid valve 16. As a result, the pressure in the variable pressure chamber 5 is discharged therefrom to the negative pressure source through the pressure fluid feed pipe 34, the low pressure passage 35, the second solenoid valve 36 and the check valve 18 so that the pressure in the variable pressure chamber 5 falls and the force of the braking drops. However, since the second solenoid valve 36 has a relatively small cross-sectional area for fluid flow, the pressure in the variable pressure chamber 5 does not quickly fall so that a strong shock is not caused at the time of restarting the stopped vehicle.

Figure 2:
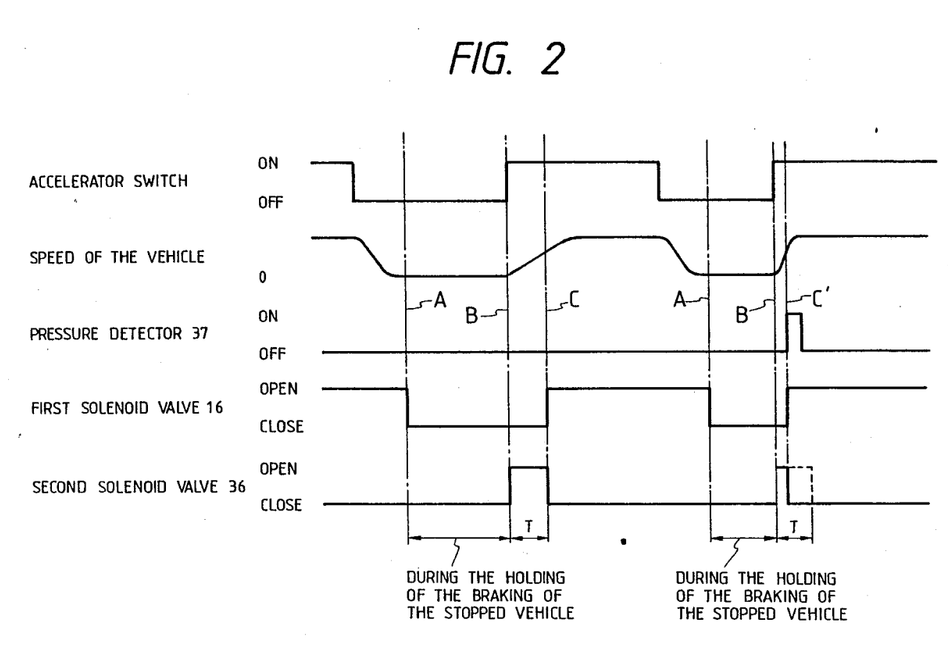
FIG. 2 shows a timing chart of signals for the operation of the vehicle brake system of FIG. 1.

When a prescribed time T has elapsed since the opening of the second solenoid valve 36 as shown at C in FIG. 2, the controller 33 closes the second solenoid valve 36 and opens the first solenoid valve 16 so that the pressure in the variable pressure chamber 5 escapes therefrom into the constant pressure chamber 4 through the communication passage 19, the valve mechanism 7, the communication passage 15 and the first solenoid valve. The pressure is then discharged to the negative pressure source through the negative pressure feed pipe 17 and the check valve 18. At that time, since the first solenoid valve 16 is large enough in cross-sectional area, the pressure in the variable pressure chamber 5 falls so quickly that the cessation of the braking of the stopped vehicle is prevented from being performed too slowly.

At the time of the release of the braking of the stopped vehicle, the controller 33 determines the magnitude of the negative pressure in the intake manifold of the engine through a pressure detector 37. When the magnitude of the negative pressure has become equal to or lower than a prescribed level due to the quick restarting of the stopped vehicle at the time of the release of the braking of the stopped vehicle, so that the pressure detector 37 is turned on as shown at C' in FIG. 2, the controller 33 immediately closes the second solenoid valve 36 and opens the first solenoid valve 16 to quickly stop the braking of the stopped vehicle to prevent the braking from lingering.

Figure 3:
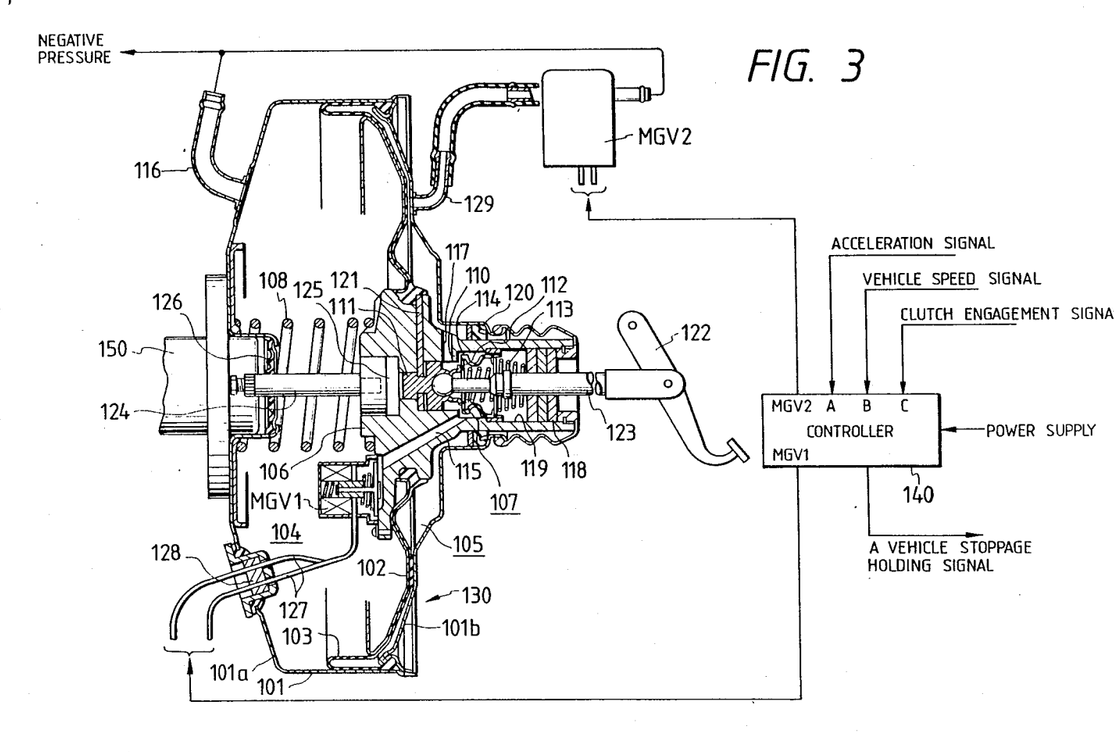
FIG. 3 shows a sectional view of a vehicle brake holding device which is another embodiment of the present invention.

FIG. 3 shows a vehicle brake holding system which is the second one of the embodiments. It includes a brake booster 130 whose shell 101 consists of a front shell 101a and a rear shell 101b. A piston 102 is slidably supported in the shell 101. A diaphragm 103 is attached to the rear of the piston 102. The interior of the shell 101 is divided into a front pressure chamber 104 and a rear pressure chamber 105 by the piston 102 and the diaphragm 103. The central portion of the piston 102 is integrally attached to a valve casing 106 in which a valve mechanism 107 for switching fluid passages is provided. Normally, the piston 102, the valve casing 106 and so forth are held in nonoperative positions (shown in FIG. 3) by a return spring 108.

The valve mechanism 107 comprises a first valve seat 110 formed on the valve casing 106, a second valve seat 112 formed on a plunger 111, and a valve stem 114, which is pressed onto either the valve seat 110 or the other valve seat 112 by the resilient force of a spring 113 biasing forward with respect to the piston 102 leftward with to FIG. 3. An internal space adjacent the contact areas of the first valve seat 110 and the valve stem 114 is connected to the front pressure chamber 104 through a passage 115 and a first solenoid valve MGV1. The front pressure chamber 104 is connected to a negative pressure source (such as the intake manifold of an engine not shown in the drawings) through a negative pressure feed pipe 116 attached to the shell 101. An internal space adjacent both the contact areas of the first valve seat 110 and the valve stem 114 and those of the second valve seat 112 and the valve stem 114 is connected to the rear pressure chamber 105 through a passage 117 provided in the valve casing 106. An internal space inside the contact portions of the second valve seat 112 and the valve stem 114 is connected to the atmosphere through a passage 119 fitted with a filter 118. A seal 120 is slidably fitted on the valve casing 106 so that the rear pressure chamber 105 is hermetically sealed from the exterior of the shell 101.

A key 121 prevents the plunger 111 of the valve mechanism 107 from dropping out of the valve casing 106. The end of the plunger 111 is coupled to an input shaft 123 movably linked to a brake pedal 122.

One end of an output shaft 124, which is moved in conjunction with the piston 102, is linked to the front end of the piston through a reaction disk 125. The output shaft 124 is slidably fit with a seal 126 provided in the cylindrical recessed portion of the front shell 101a and projects out from the shell 101. The front end of the output shaft 124 is coupled to the piston of a master cylinder 150 so that the output shaft 124 and the piston are moved in conjunction with each other.

The first solenoid valve MGV1, which is opened when it is de-energized, is attached to the valve casing 106 in the front pressure chamber 104 so that the passage 115 provided in the valve casing is opened or closed by the first solenoid valve. Electric wires 127 connected to the first solenoid valve MGV1 are led through a seal 128 fitted in the front shell 101a, and are connected to a controller 140.

The rear pressure chamber 105 is connected to the negative pressure source not through the valve mechanism 107 but through a pressure feed pipe 129 (attached to the rear shell 101b) and a second solenoid valve MGV2 which is electrically coupled to the controller 140 so that the second valve MGV2 is closed when it is de-energized. The controller 140 regulates the opening and closing of the first and the second solenoid valves MGV1 and MGV2.

Normally, the controller 140 acts so that the second solenoid valve MGV2 on the atmospheric side of the booster is closed and the first solenoid valve MGV1 is opened. In that case, the brake booster 130 is out of action so that negative pressure introduced into the front pressure chamber 104 through the negative pressure feed pipe 116 is sent into the passage 115 through the first solenoid valve MGV1 and then introduced into the rear pressure chamber 105 through the valve mechanism 107 and the passage 117. As a result, no fluid pressure difference exists between the front and rear of the piston 102, so that the brake booster 130 is kept out of action in the configuration shown in FIG. 3 just as in a conventional brake booster which does not have such first and second solenoid valves.

When the brake pedal 122 is depressed, a braking force proportional to the depressive force on the brake pedal is produced by the brake booster, as is done as well in the conventional brake booster.

If the brake booster 130 is to be put into action to maintain the stoppage of a vehicle by the brake holding device, an accelerator pedal depression (or non-depression) signal, a vehicle speed signal and a clutch engagement (or disengagement) signal are supplied from detectors to the controller 140 so that the opening and closing of the first and the second solenoid valves MGV1 and MGV2 are regulated by the output signals from the controller depending on operating conditions as described below.

A wait time is determined during which the accelerator pedal non-depression signal and a zero value vehicle speed signal are supplied to the controller 140 during the braking of the stopped vehicle which is performed by depressing the brake pedal 122. When a prescribed wait time of 0.5 seconds, for example, has elapsed, the controller energizes the solenoid of the first solenoid valve MGV1 to close it to hold the braking of the stopped vehicle and sends out a vehicle stoppage holding signal. The braking of the stopped vehicle is thus automatically maintained so that the braking of the vehicle is maintained even if the driver's foot is removed from the brake pedal 122. The prescribed wait time is also used for confirming whether or not the driver of the vehicle intends to hold the braking of the vehicle.

When the clutch engagement signal (a clutch half-engagement signal may be used instead) is supplied to the controller 140 during the holding of the braking of the stopped vehicle, the controller energizes the solenoid of the second solenoid valve MGV2 to open it. If the supply of the clutch engagement signal to the controller 140 has lasted for a prescribed time of 0.2 second, for example, the controller 140 de-energizes the solenoid of the second solenoid valve MGV2 to close it and de-energizes the solenoid of the first solenoid valve MGV1 to open it, to cease holding the braking of the stopped vehicle and send out a brake holding cessation signal. Otherwise, when the accelerator pedal depression signal and non-zero vehicle speed signal are simultaneously supplied to the controller 140 during the holding of the braking of the stopped vehicle, the controller de-energizes the solenoid of the first solenoid valve MGV1 to open it to cease holding the braking of the stopped vehicle and sends out the vehicle brake holding cessation signal. The holding of the braking of the stopped vehicle is thus released so that the vehicle brake holding device functions as an ordinary brake apparatus again.

Since the second solenoid valve MGV2 is opened in response to the supply of the clutch engagement signal to the controller 140 to connect the rear pressure chamber 105 to the negative pressure source for the prescribed time, the negative pressure corresponding to the prescribed time is introduced into the rear pressure chamber through the pressure fluid feed pipe 129 so that a decrease of pressure corresponding to the introductions of the negative pressure is performed. After that, the first solenoid valve MGV1 is opened so that the holding of the braking of the stopped vehicle is ceased as mentioned above. In ceasing the holding of the braking of the stopped vehicle, the brake pedal 122 is slowly returned to its undepressed position to reduce the noise of the brake pedal to prevent the driver of the vehicle from feeling unpleasant.

Figure 4:
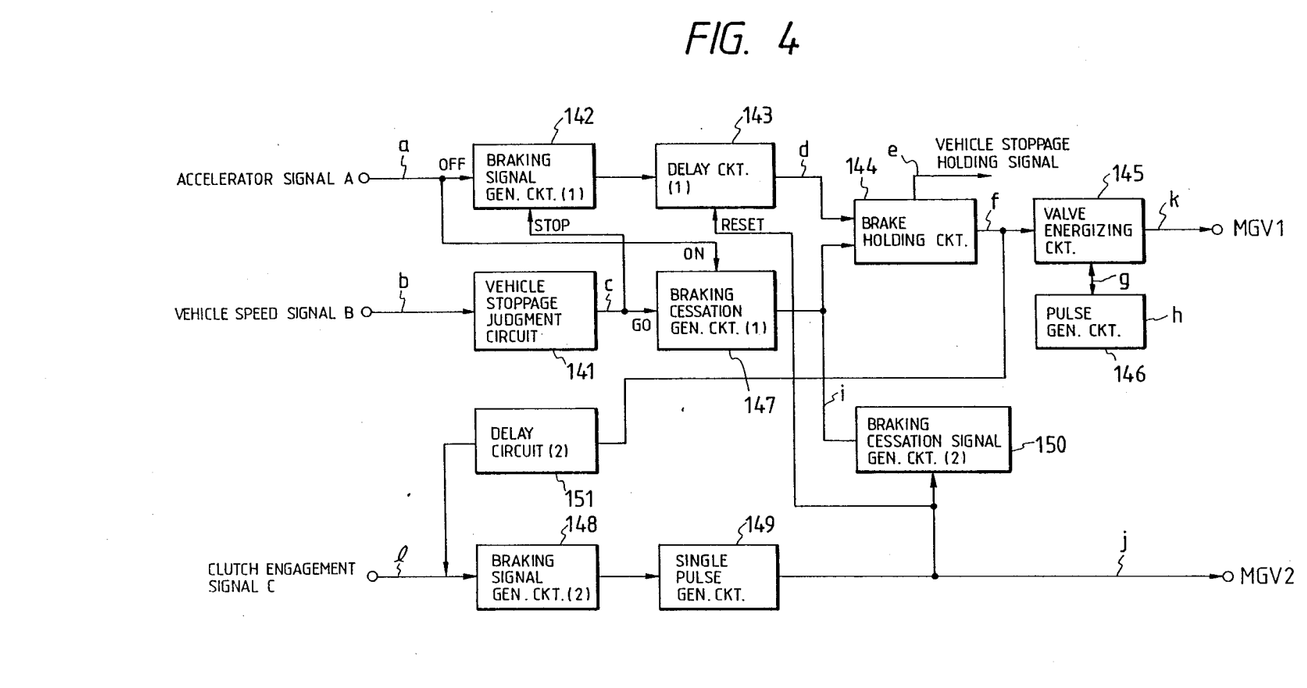
FIG. 4 shows a block diagram of the controller of the vehicle brake holding device of FIG. 3.
Figure 5:
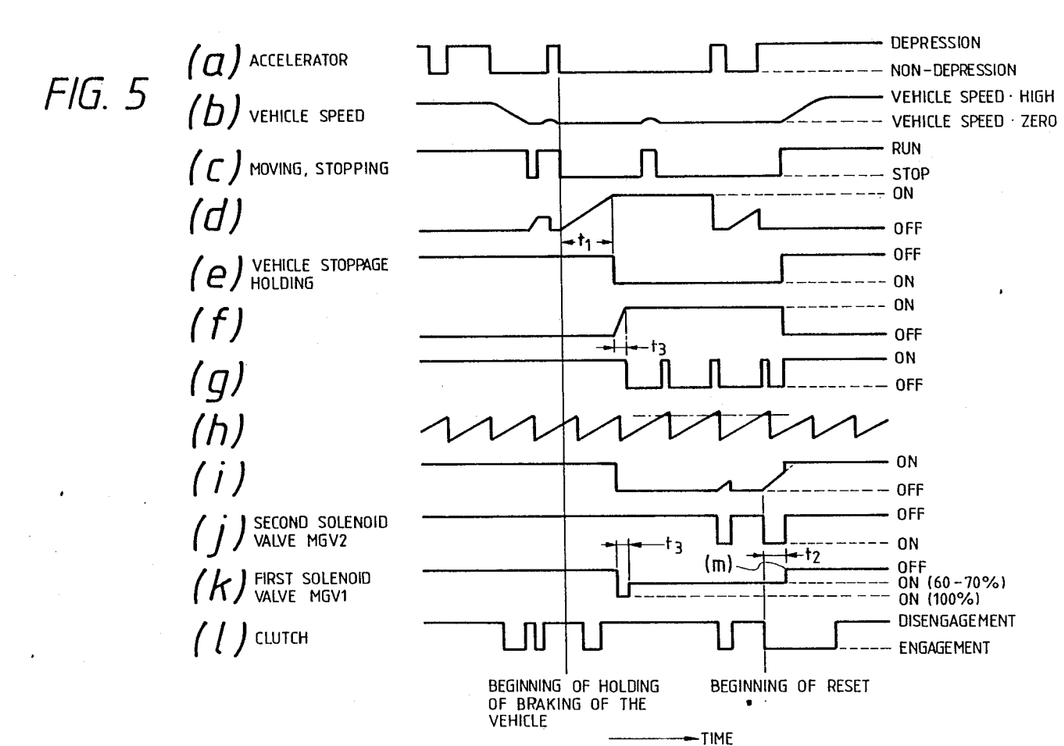
FIG. 5 shows a timing chart of the signals for the controller of FIG. 4.

The operation of the controller 140 is described in detail from now on. FIG. 4 shows a block diagram of the controller 140. FIG. 5 shows timing chart of signals for the controller 140. The accelerator pedal depression or non-depression signal is shown at (a) in FIG. 5. The vehicle speed signal shown at (b) in FIG. 5 has a number of pulses proportional to the speed of the vehicle. These two signals and the clutch engagement or disengagement signal shown at (1) in FIG. 5 are supplied to the input terminals A, B and C of the controller 140, respectively. The vehicle speed signal supplied to the terminal B is entered into a vehicle stoppage judgment circuit 141 so that the time circuit only judges whether the speed of the vehicle is zero (the vehicle is stopped) or not (the vehicle is moving). A vehicle speed judgment signal shown at (c) in FIG. 5 is sent from the vehicle stoppage judgment circuit 141 to a braking signal generation circuit 142 and a braking cessation signal generation circuit 147.

When the accelerator pedal non-depression signal supplied to the terminal A and the zero-valued vehicle speed signal sent from the vehicle stoppage judgment circuit 141 are entered into the braking signal generation circuit 142, the braking signal generation circuit produces a braking signal and sends it out to a delay circuit 143. In the delay circuit 143, the braking signal is delayed by the prescribed wait time $t_1$ of 0.5 second, for example, which is for confirming whether or not the driver of the vehicle intends to keep stopping the vehicle so that the braking signal shown at (d) in FIG. 5 is sent out from the delay circuit 143 to a brake holding circuit 144. In response to the braking signal, the braking holding circuit 144 sends out a vehicle stoppage holding signal shown at (e) in FIG. 5 and supplies a valve energizing reduction circuit 145 with a brake holding signal (shown at (f) in FIG. 5) for energizing the first solenoid valve MGV1. Although the valve energizing reduction circuit 145 initially, during the prescribed time $t_3$, supplies a rated voltage pulse width (100% on) to the first solenoid valve MGV1 to energize it, the valve energizing reduction circuit thereafter continues to supply the first solenoid valve with voltage pulses shown at (k) in FIG. 5 having an average voltage substantially lower than the rated voltage in order to maintain the energizing of the first solenoid valve and to suppress the heating of its solenoid. The voltage for the pulses is pulse width modulated and the average magnitude of the pulse voltage is equal to 60 to 70% of that of the rated voltage. A pulse generation circuit 146 produces control pulses (shown at (g) in FIG. 5) for the pulse width modulation. For example, the peak values of a continuous saw-toothed wave above a threshold, shown at (h) in FIG. 5, are passed during the period of the input of the brake holding signal, and the continuous saw-toothed wave is then processed by a Schmitt circuit so that the pulses at (g) in FIG. 5 are produced by the pulse generation circuit 146.

When the accelerator pedal depression signal supplied to the terminal A and vehicle speed non-zero signal output from the vehicle stoppage judgment circuit 141 are received by the braking cessation signal generation circuit 147, it produces a braking cessation signal and outputs it to the brake holding circuit 144.

When the clutch engagement signal (1) supplied to the terminal C is received by a braking signal generation circuit 148, it produces a braking signal and outputs it to a single pulse generation circuit 149 so that a single pulse shown at (j) in FIG. 5 is produced by the single pulse generation circuit 149 for the prescribed time $t_2$ or 0.2 second, for example, to energize the second solenoid valve MGV2. As a result, the second solenoid valve MGV2 is energized for the prescribed time $t_2$ and thereafter de-energized. Besides, the single pulse shown at (j) in FIG. 5 resets the delaying action of the delay circuit 143, and is input into a braking cessation signal generation circuit 150 so that a braking cessation signal shown at (i) in FIG. 5 is output to the brake holding circuit 144 after being delayed by the prescription time $t_2$, to cease the keeping of the braking of the vehicle. As a result, the first solenoid valve MGV1 is de-energized so that the valve is opened.

A delay circuit 151 functions to prevent the proper action of the brake holding circuit 144 from being hindered by interference when the accelerator pedal depression signal, the vehicle speed zero signal and the clutch engagement signal are simultaneously supplied to the controller 140. The delay circuit 151 also functions to enter the clutch engagement signal into the braking signal generation circuit 148 only when the braking of the vehicle is being held. In such case, the holding and release of the braking of the vehicle are alternately repeated.

Since the braking of the vehicle is held only while the accelerator pedal depression signal and the zero speed signal (implying the stoppage of the vehicle) have persisted during the braking of the vehicle, the braking can be released by the accelerator pedal depression signal even if the vehicle speed signal from a vehicle speed sensor vanishes due to some cause. A fail-safe means is thus provided for the vehicle speed signal.

Since the holding of the braking of the vehicle is ceased when the clutch engagement signal has lasted during the holding of braking of the vehicle or when the accelerator pedal depression signal and the non-zero vehicle speed signal are present during the holding of the braking of the vehicle, the brake holding can be released by the accelerator pedal signal and the vehicle speed signal even if the clutch disengagement signal is supplied due to some cause. A fail-safe means is thus provided for the clutch signal.

The present invention is not confined to the above-described embodiments, but may be embodied in other various ways without departing from the essential character and spirit of the invention.

What is claimed is:

1. A vehicular brake device, comprising:
a power piston slidably supported in a shell;

a valve mechanism provided in a valve casing at a central portion of said piston and including a valve plunger;

a constant pressure chamber defined on a front side of said piston with regard to the direction of braking action thereof;

a variable pressure chamber defined on a rear side of said piston with regard to said direction;

a low pressure fluid source which is connected to said constant pressure chamber;

communication passages for connecting said constant pressure chamber and said variable pressure chamber to each other through said valve mechanism;

a pressure passage for connecting said variable pressure chamber and a high pressure fluid source to each other through said valve mechanism;

an input shaft which functions to put said valve plunger of said valve mechanism into action to switch fluid passages to disconnect said communication passages between said constant pressure chamber and said variable pressure chamber from each other and to feed a high pressure fluid from said pressure passage to said variable pressure chamber to move said piston forward;

a first solenoid valve which is capable of opening and closing one of said communication passages between said valve mechanism and said constant pressure chamber;

a low pressure passage connecting said variable pressure chamber to said low pressure fluid source; and a second solenoid valve smaller in cross-sectional area of fluid passage than said first solenoid valve and provided in said low pressure passage.

2. A vehicular brake device as recited in claim 1, further comprising control means to control said first solenoid valve to close said one communication passage and to close said second solenoid valve so that said constant pressure chamber and said variable pressure chamber are disconnected form each other and said variable pressure is disconnected from said low pressure fluid source even if said valve mechanism connects said communication passages because of a removal of operating force from said input shaft.

3. A vehicular brake device recited in claim 2, wherein said control means in response to signals indicating a release of holding braking opens said second solenoid valve before opening said first solenoid valve.

4. A vehicular brake device, as recited in claim 1, further comprising;

sensors attached to operational parts of a vehicle for detecting operational conditions of said vehicle; and control means responsive to said detected operational conditions for controlling said first and second solenoid valves.

5. A vehicular brake device as recited in claim 4, wherein, when said detected operational conditions indicate a brake holding mode, said control means closes said first solenoid valve.

6. A vehicular brake device as recited in claim 5, wherein, when said detected operational conditions indicate a cessation of said brake holding mode, said control means first opens said second solenoid valve and thereafter closes said second solenoid valve and opens said first solenoid valve.

7. A vehicular brake device as recited in claim 6, wherein one of said sensors is a pressure sensor sensing a pressure of said low pressure source and wherein said control means closes said second solenoid and opens said first solenoid at a time which is the earlier of a predetermined time after said control means opens said second solenoid valve and a time when said pressure sensor detects a predetermined pressure condition.

8. A vehicular brake device as recited in claim 5, wherein said control means includes delay means for delaying said closing of said first solenoid valve for a predetermined time after said holding mode has been indicated.

9. A vehicular brake device as recited in claim 4, wherein said detected operational conditions indicate a brake holding mode, said control means feeds a driving current for a predetermined pulse period and then said control means feeds a holding current to close said first solenoid valve, said holding current being smaller than said driving current.

10. A vehicular brake device as recited in claim 4:
wherein said sensors include a sensor for sensing a predetermined depression of an accelerator pedal, a sensor for sensing a non-zero speed of said vehicle and a sensor for sensing an engagement of a clutch of said vehicle:

wherein said control means closes said first solenoid valve when said non-zero speed and a lack of said predetermined depression are sensed to persist for a predetermined time during a braking of said vehicle, to thereby hold said braking; and wherein said control means opens said second solenoid valve when said engagement is sensed during said held braking and thereafter, if said engagement of said clutch is sensed for a predetermined time during said held braking, closes said second solenoid valve and opens said first solenoid valve to thereby terminate said held braking. pedal, a sensor for sensing a non-zero speed of said vehicle and a sensor for sensing an engagement of a clutch of said vehicle:

wherein said control means closes said first solenoid valve when said non-zero speed and a lack of said predetermined depression are sensed to persist for a predetermined time during a braking of said vehicle, to thereby hold said braking; and wherein said control means opens said second solenoid valve when said engagement is sensed during said held braking and thereafter, if said engagement of said clutch is sensed for a predetermined time during said held braking, closes said second solenoid valve and opens said first solenoid valve to thereby terminate said held braking.

11. A vehicular brake device as recited in claim 4:
wherein said sensors include a sensor for sensing a predetermined depression of an accelerator pedal and a sensor for sensing a speed of said vehicle;

wherein said control means closes said first solenoid valve when said speed and a lack of said predetermined depression are sensed to persist for a predetermined time during a braking of said vehicle, to thereby hold said braking; and wherein said control means opens said first solenoid valve in response to said sensed predetermined depression of said pedal and said sensed zero speed during said holding of said braking, to thereby terminate said brake holding.

12. A vehicle stoppage brake holding device capable of holding the stoppage of a vehicle, comprising:
a brake booster which includes an input shaft movably couple to a brake pedal and an output shaft movably coupled to a diaphragmed piston and which functions to regulate a valve mechanism by said input shaft so that a passage for connecting a front and rear pressure chamber on the front and rear of said piston in a shell to each other, and a passage for connecting said rear pressure chamber and an atmospheric pressure to each other are switched by said valve mechanism;

a first solenoid valve capable of opening and closing said passage connecting said front and rear pressure chambers through said valve mechanism;

a second solenoid valve capable of opening and closing a passage connecting said rear pressure chamber and a vacuum source to each other; and a controller which acts to close said first solenoid valve to hold braking of a vehicle when an absence of an accelerator signal and a stoppage of said vehicle have lasted for a prescribed time during said braking, and which acts to open said second solenoid valve at a time of engagement of a clutch during the holding of the braking of said vehicle and to thereafter close said second solenoid valve again and open said first solenoid valve if said engagement has lasted for a prescribed time during said holding of said braking, so as to cease said holding of said braking.

13. A vehicle stoppage brake holding device capable of holding the stoppage of a vehicle, comprising:

a holding brake booster which includes an input shaft movably coupled to a brake pedal and an output shaft movably coupled to a diaphragmed piston and which functions to regulate a valve mechanism by said input shaft so that a passage for connecting a front and a rear pressure chamber on the front and rear of said piston in a shell to each other, and a passage for connecting said rear passage chamber and an atmospheric pressure to each other are switched by said valve mechanism;

a first solenoid valve capable of opening and closing said passage connecting said front and rear pressure chambers through said valve mechanism;

a second solenoid valve capable of opening and closing a passage connecting said rear pressure chamber and a vacuum source to each other; and a controller which acts to close said first solenoid valve to hold a braking of a vehicle when an absence of an accelerator signal and a stoppage of said vehicle have lasted for a prescribed time during said braking, and which acts to open said first solenoid valve at the time of a presence of said accelerator signal and a beginning of movement of said vehicle during said holding of said braking, so as to cause said brake holding.

* * * * *